Oct. 27, 1936.   C. E. REED   2,058,624
ROLLER CUTTER DRILL
Original Filed Sept. 7, 1933
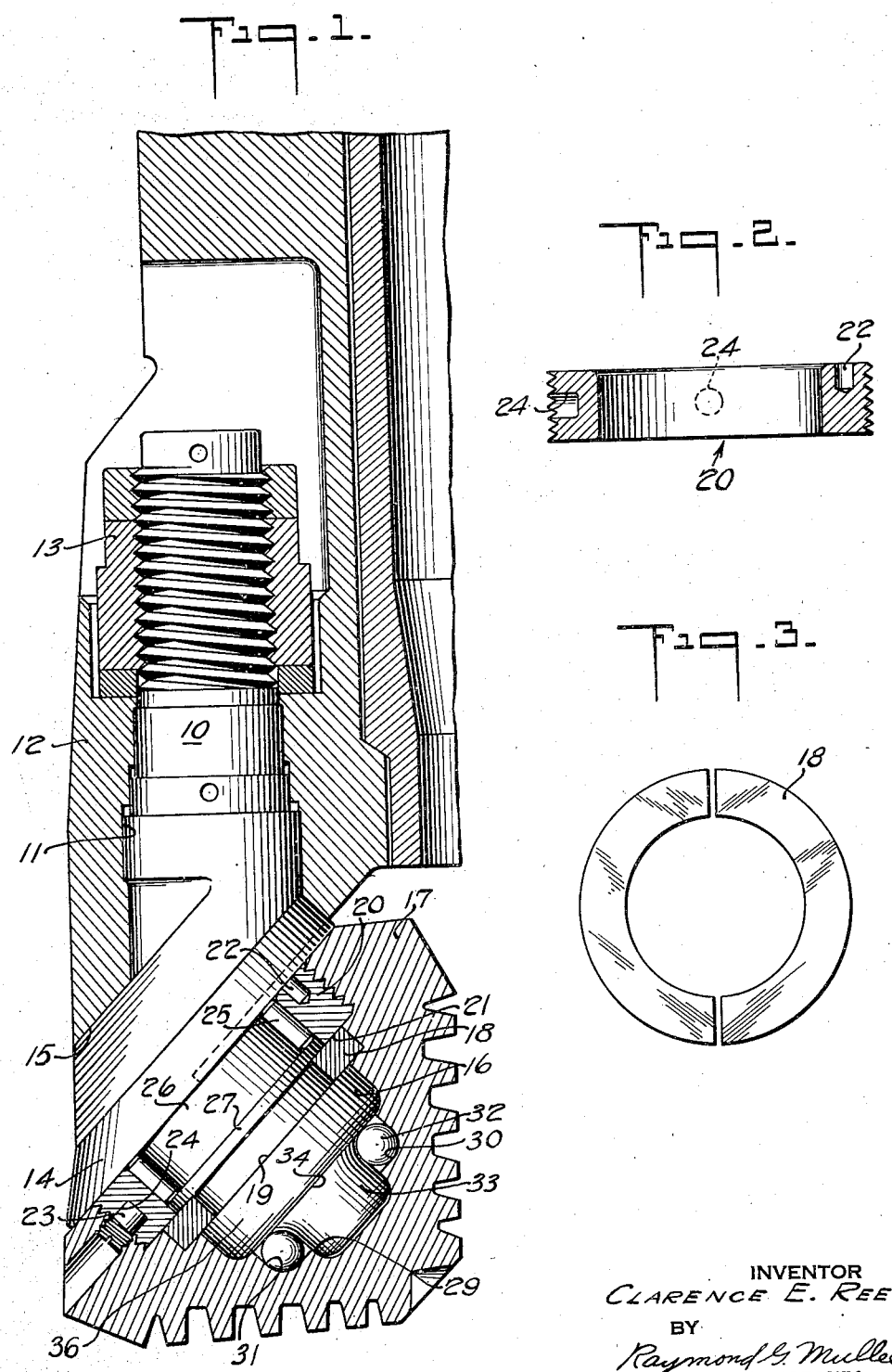
INVENTOR
CLARENCE E. REED.
BY
Raymond G. Mullee
ATTORNEY

UNITED STATES PATENT OFFICE 2,058,624

ROLLER CUTTER DRILL

Clarence E. Reed, Wichita, Kans., assignor to Chicago Pneumatic Tool Company, New York, N. Y., a corporation of New Jersey Original application September 7, 1933, Serial No. 688,492. Divided and this application November 14, 1935, Serial No. 49,672

12 Claims. (Cl. 255—71)

This invention relates to earth boring, more especially to an arrangement for retaining a roller cutter upon a spindle in a rotary drill bit.

The present application is a division of application Serial No. 688,492, filed September 7, 1933.

An object of the invention is to lock a roller cutter, such as a cone, upon its spindle in such manner as to reduce friction between the latter and the cutter. The invention contemplates the use of both cylindrical and ball bearings.

Another object of the invention is the provision of a rolling bearing raceway, or raceways, between a cutter and spindle, which does not necessitate the weakening of any parts to provide for the insertion of the rolling elements into their operative positions. Several prior arrangements employ rolling elements mounted in an annular groove in a spindle for retaining the cutter on the spindle, but in each of these arrangements the problem of assembling the parts presented itself. It has been suggested to provide an opening extending through the wall of the cutter to permit the insertion of the rolling elements into the raceway while the cutter and spindle are in their operative position. Another suggestion is to provide a passage leading through the inside of the spindle for the same purpose. Either of these methods has the disadvantage of weakening the part in which the passage is provided. Moreover, the point of entry of the balls or rollers presents a broken surface at the inside or outside of the raceway, over which surface the rolling elements pass continually thereby interfering with the free rotation of the cutter and tending to break the rolling elements. In accordance with the present invention, however, the rollers and balls are mounted within smooth raceways devoid of any openings tending to weaken either the spindle or the cutter.

The foregoing objects of the invention are made possible by the use of a retaining ring normally rotatable with a cone cutter but removable therefrom, said retaining ring engaging locking elements disposed within an annular recess in the spindle.

A further object of the invention is to reduce the friction between a retaining ring of the type described and that portion of the spindle on which the ring rotates. This object is effected by inserting rollers between the ring and the spindle, the rollers preferably being in the form of cylinders having axes parallel to the spindle axis.

A still further object of the invention is to take up the thrusts between a roller cutter and its spindle by means of anti-friction bearings. In the illustrative embodiment of the invention, the bearings comprise rolling elements mounted in raceways separated from each other by smooth cylindrical surfaces which assist in sustaining a portion of the thrust and in holding the cutter in proper alignment on the spindle. Outward thrusts of the cutter are taken by balls engaging a radial shoulder on the spindle.

Other objects and features of the invention will appear more clearly from the following description taken in connection with the accompanying drawing and appended claims.

In said drawing:

Fig. 1 is a view of a roller cutter unit embodying the present invention with parts in section and parts in elevation, and with a part of the bit head shown in section;

Fig. 2 is a section of the retaining ring shown in Fig. 1; and

Fig. 3 is a plan view of the locking rings in Fig. 1.

The roller cutter unit shown in the drawing has a shank 10 to fit removably in a socket 11 in the bit head 12 where it is held by any suitable locking member, such as indicated generally at 13. The shank 10 extends at an angle from the base plate 14 of the unit, which base plate is adapted to fit a seat recess 15 in the bit head. The method of securing the shank to the bit head will be understood more clearly by reference to applicant's prior Patent Re. 17,741, reissued July 22, 1930.

From the base plate 14 a spindle 16 projects and on this spindle the roller cutter 17 is revolubly mounted. The spindle may be of stepped form, presenting portions of different diameters, as shown, or it may be of other forms, such for instance as conical.

The roller cutter which is conical or approximately so has a bore to fit in part the shape of the spindle. For locking the roller cutter on the spindle in such manner that it will be retained in proper position relative to the bit head and yet be capable of free rotative movement about the spindle, floating segments 18 are mounted in a groove 19 of the spindle, and of such external diameter as to project from said spindle and thus provide, in effect, an annular rib or shoulder. The portion of the bore in the roller cutter adjacent this rib or shoulder made up of the segments is formed to fit said rib. At the large or rear end of the bore of the roller cutter a ring 20 is mounted, this being connected with the cutter member by a screwthread, so that the said ring turns with the cutter. The inner diameter of the screw ring 20 is such that it will turn freely on the spindle, and at the front side, i. e., at 21, the face of the ring contacts with the rear or inner face of the segmental locking ring 18. By the engagement of the screw ring back of the segmental ring, the roller cutter is retained on the spindle, but with freedom of rotation thereon. The screw ring has sockets 22 by which a holding implement may be engaged with the ring to hold it while the roller cutter is turned to screw it onto the ring. When these parts, roller cutter and screw threaded ring, have been assembled, they may be held by a pin 23 passing through the wall of the roller cutter into a socket 24 of the ring.

In order to reduce friction between the screw ring 20 and the spindle 16, rollers 25 are mounted within a reduced portion or groove 26 on the spindle, which lies between the base plate 14 and an annular flange 27. These rollers are of cylindrical shape and have their axes extending parallel to the spindle axis and are adapted to engage both the screw ring 20 and the reduced portion 26 of the spindle. The flange 27 may bear loosely on the inside of the screw ring 20 or may be slightly spaced therefrom.

The cutter 17, near its closed end, is provided with a cylindrical bearing portion 29 engaging the free end of the spindle and serving as a centering means for keeping the axis of the cutter in proper alignment with the spindle axis. Adjacent to the bearing portion, the cutter is provided with a recess defined by the radial wall 30 and cylindrical wall 31. Ball bearings 32 engage both of these walls as well as two complementary surfaces on the spindle comprising the bearing portion 33 and a shoulder 34. By virtue of the engagement of the balls with the four surfaces 30, 34, 33 and 31, the balls are capable of resisting thrust components on the cutter in the direction of its axis and at right angles thereto. Thus, the tendency of the cutter to move with respect to the spindle is opposed. The cutter recess defined by the walls 30 and 31 is preferably rounded at the corner to conform to the shape of the balls 32. The junction of the projection 33 and the shoulder 34 is similarly rounded so that in operation both the supporting and supported surfaces of the balls cover a large area.

The two sets of rolling bearings 25 and 32 cooperate with each other and with an intermediate bearing portion 36 on the spindle which directly engages the cutter. The rolling bearings insure ease of rotation regardless of the thrusts imposed upon the cutter, the intermediate bearing 36 and the projection 33, and maintain the axis of the cutter in proper alignment with the spindle. Taking up thrusts and reducing friction in this manner prolongs the life of the cutter unit, obviates the need of a lubricator and eliminates the possibility of the cutter dragging at the bottom of the hole.

In assembling the parts of the roller cutter unit, the cylindrical rollers 25 are placed in the annular groove 26 and covered by the screw ring 20. The segments 18 are inserted in the groove 19. The balls 32 having been placed at the bottom of the cutter bore, the cutter 17 is screwed onto the ring 20, thus forcing the balls into the proper position. The screw ring and roller cutter may be fixed against removal by inserting the pin 23. The unit comprising the spindle, bearings, retaining means and cutter, is then moved as a unitary structure into assembled relation with the bit head.

While the invention has been disclosed in a preferred embodiment, it will be understood that further modifications and changes could be made without departing from the spirit of the invention or the scope of the claims. For example, the ring 20 may be secured to the cutter by means other than a screw thread and various alternative methods could be employed for attaching the spindle 16 to the bit head. Furthermore, the cylindrical rollers and their associated bearing surfaces could be constructed in tapered or frustoconical form without destroying all of the advantages of the present invention.

What is claimed is:

1. In a roller bit, a bit head, a spindle having at one end a base plate which is carried by the bit head, a cutter rotatably mounted on the spindle, two spaced sets of rolling bearings interposed between the spindle and cutter, two spaced annular surfaces on the spindle to provide frictional bearing for the cutter, both of said annular surfaces lying between the sets of roller bearings, complementary spaced annular bearing surfaces carried by the cutter and engaging the first-mentioned surfaces, and locking means for the cutter positioned in a groove interposed between said annular surfaces.

2. A roller bit according to claim 1 in which one of said sets of rolling bearings lies in a groove on the spindle which is adjacent to said base plate, and the roller bearings in said last mentioned set are of cylindrical form.

3. A roller bit comprising a bit head, a spindle supported by said bit head and projecting downwardly and inwardly toward the axis of the bit, a cutter rotatably mounted on said spindle, said cutter having on its exterior surface a cutting zone of conical shape, the apex of which is adjacent the bit axis and another cutting zone at the base of the cutter which is tapered with respect to the conical zone, a set of rolling bearings between the cutter and spindle and surrounded by the base zone, a second set of rolling bearings between the cutter and spindle and surrounded by the conical cutting zone, said cutter and spindle having complementary engaging surfaces providing a frictional bearing for the cutter between the two sets of rolling bearings and having complementary engaging surfaces providing a frictional bearing for the cutter at the free end of the spindle, the rolling bearings in the first-mentioned set being of cylindrical form.

4. A roller bit according to claim 3 in which one set of rolling bearings engages a shoulder on the spindle to resist movement of the cutter outwardly from the bit axis.

5. A drill bit comprising a spindle having two bearing surfaces separated by an annular groove, a cutter rotatably mounted on said spindle and in direct engagement with one of said bearing surfaces, one or more locking elements mounted in the groove and projecting beyond said bearing surfaces, a retaining ring secured to the cutter and engaging the locking element or elements, said ring surrounding and engaging the other bearing surface, a set of roller bearings interposed between the spindle and the ring, and a set of ball bearings interposed between the spindle and cutter and in spaced relation to the roller bearings.

6. A well drill including a head, a spindle on said head having a shoulder and a curved fillet between spindle portions of different diameters, a cutter enclosing one end of the spindle, the cutter bore having one wall substantially in a plane parallel to and opposite the shoulder and another wall concentric with a spindle portion, a curved surface connecting said walls, cylindrical roller bearings and ball bearings between the cutter and the spindle, said balls having bearing contact on said shoulder and fillet of the spindle and bearing on said walls and curved surface of said cutter, the free end of said spindle having frictional engagement with a surrounding surface on the cutter to maintain the cutter and spindle in axial alignment.

7. A well drill according to claim 6 in which the cutter is of approximately frusto-conical shape and has spaced rows of teeth in an apex zone and a single row of wide teeth in a base zone inclined relative to the first-mentioned rows.

8. In earth boring apparatus, supporting means for a roller cutter comprising a spindle having stepped coaxial cylindrical portions and having an annular groove defined by annular shoulders on the external surface of the spindle, said shoulders being integral with and unremovable from the spindle, a roller cutter of approximately conical shape mounted on said spindle, the inside surface of the cutter comprising stepped coaxial cylindrical bearing surfaces cooperating respectively with the stepped portions of the spindle to provide bearing means for the cutter, cylindrical rollers mounted in said groove with their axes parallel to the axis of the spindle and their ends adapted to abut against said shoulders, said rollers bearing on both the spindle and cutter, and means for removably locking the cutter to the spindle.

9. In earth boring apparatus, roller cutter supporting means according to claim 8 in which the spindle is integrally united to one end of a shank extending at an angle to the spindle, the other end of the shank being threaded to provide means of attachment to a supporting member.

10. In earth boring apparatus, roller cutter supporting means according to claim 8 in which one end of the spindle is integrally united to a supporting shank and the other end of the spindle is provided with one of said cylindrical portions, the last-named portion being in direct engagement with the cooperating cylindrical surface on the inside of the cutter, whereby to aid in centering the cutter about the axis of the spindle.

11. A roller bit comprising a shank threaded at its upper end for connection to a supporting member, the lower end of the shank being integrally united to a spindle extending downwardly and inwardly therefrom toward the axis of the bit, the spindle having a cylindrical portion of relatively large diameter adjacent the shank and a cylindrical projection of smaller diameter at its free end, said cylindrical portion being recessed to provide an external annular groove, the surfaces defining said groove being all integral with and unremovable with respect to the spindle, cylindrical rollers mounted in said groove and having their axes parallel to the axis of the spindle, a roller cutter of approximately conical shape mounted on said spindle, the internal surface of said cutter comprising a cylindrical surface adapted to fit the projection on the spindle and to bear directly thereupon over an area coaxial with the spindle, and comprising a surface of larger diameter cooperating with said cylindrical portion and having bearing engagement with the rollers, and means for removably holding the cutter on the spindle.

12. A roller boring drill comprising a spindle integral with its support and having a free end, an approximately frusto-conical roller cutter enclosing said free end, said spindle having a groove adjacent the support, roller bearings in said groove, another groove in said spindle spaced from said support towards the free end of the spindle, and separated by a flange from the groove first mentioned, means in said other groove projecting beyond the periphery of the spindle and engaging the roller cutter, and rotatively locking said roller cutter on the spindle, the free end of the spindle having friction bearing contact with the roller cutter and also comprising an end thrust bearing sustaining thrusts of the cutter towards the support.

CLARENCE E. REED.